April 19, 1966  J. C. HAMRICK  3,246,878
APPARATUS FOR INTRODUCING A LINE THROUGH A CONDUIT
Filed Feb. 23, 1965  2 Sheets-Sheet 1

INVENTOR:
JAMES C. HAMRICK
BY Barrett, Bell, Seltzer, Park & Heard
ATTORNEYS

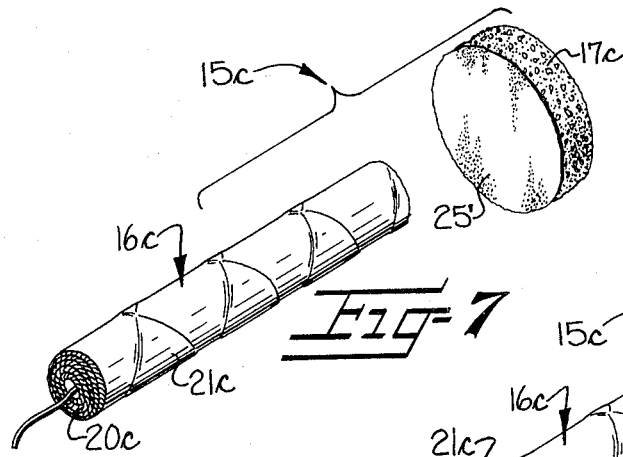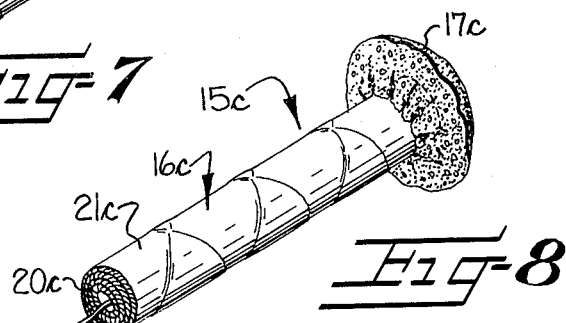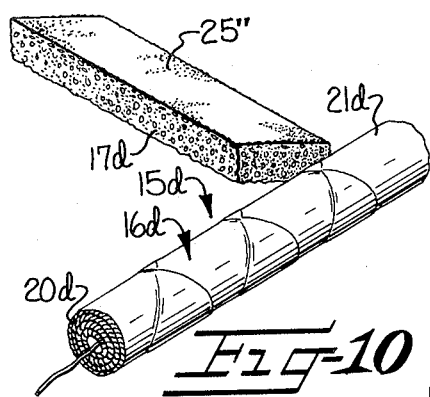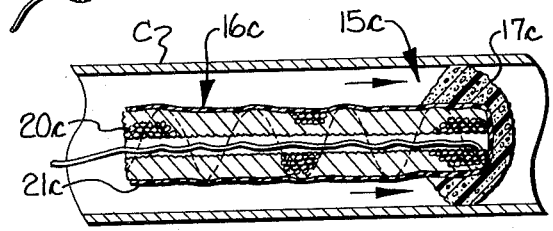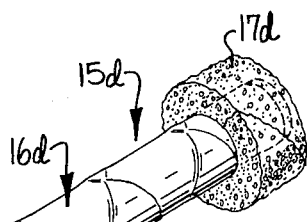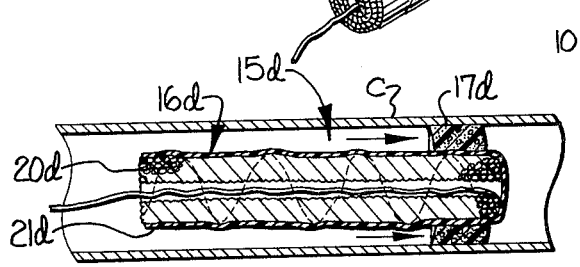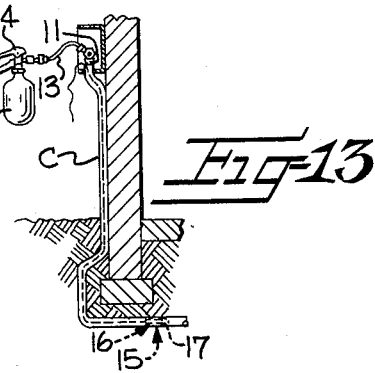

United States Patent Office 3,246,878
Patented Apr. 19, 1966

3,246,878
APPARATUS FOR INTRODUCING A LINE
THROUGH A CONDUIT
James Carver Hamrick, Matthews, N.C., assignor to Jet
Line Products, Inc., Matthews, N.C., a corporation of
North Carolina
Filed Feb. 23, 1965, Ser. No. 434,308
17 Claims. (Cl. 254—134.4)

The present application is a continuation-in-part of my copending application Serial No. 178,802, filed March 12, 1962, now Patent No. 3,179,375, and entitled Apparatus For Laying Lines in Conduits.

This invention relates to an apparatus for introducing a guide line through a conduit to facilitate the installation of a relatively rigid line or similar elongated article—such as an electrical cable or conductor, a lengthy thermo-sensitive element, etc.—within the length of the conduit by attaching the relatively rigid line to one end of the guide line extending through the conduit and thereafter pulling on the other end of the guide line to draw the relatively rigid line within the conduit.

In my earlier U.S. Patent No. 3,006,607, issued October 31, 1961, there were disclosed a method and apparatus for the purpose described above. This apparatus included a line package formed of a flexible elongated roll of line and a flexible casing therearound having a cross-sectional area of a size substantially filling the internal cross-sectional area through which a pliable guide line is to be introduced and which was moved through the conduit by a pressure differential being created therein while line was unwound therefrom within the conduit.

Situations frequently arise in which the outer diameter of a line package of the type disclosed in my earlier patent is relatively small as compared to the internal diameter of the conduit through which the guide line is to be introduced. Under such circumstances, the creation of a differential pressure within the conduit may be impractical or uneconomical because of the high percentage of wasted fluid pressure which may pass by the relatively small sized line package in the space between the line package and the internal wall of the conduit. In extreme instances, this disparity in diameters between the elongated line package and the conduit through which it is to be passed may be so great as to cause the line package to either not move through the conduit, or to depart from its longitudinal head-long flight through the conduit and to assume a position where its longitudinal axis is transversely disposed with respect to the longitudinal axis of the conduit, or the line package may even reverse itself within the conduit. Such occurrences would seriously impair the efficiency of the line package in laying line within the conduit or may even stop this function altogether.

In my earlier U.S. Patent No. 3,120,947, issued February 11, 1964, there were disclosed a method and apparatus which were for use in such situations in which the outer diameter of the line package is relatively small as compared to the internal diameter of the conduit through which the guide line is to be introduced. This apparatus includes and the method utilizes an elongated cylindrical plug of compressible material adapted to be positioned within a conduit, with the internal wall of which the plug forms a substantial sealing area, behind an elongated roll of line. The cylindrical plug pushes the roll of line through the conduit as the same is moved therethrough by a differential pressure and line is unwound from the roll of line.

The present invention which embodies four forms, two of which have been divided out of my copending application Serial No. 178,802, accomplishes in a different and better manner the same purpose as the aforementioned method and apparatus of my earlier U.S. Patent No. 3,120,947. In this respect, the present invention contemplates apparatus for introducing a guide line through a conduit including an improved line package adapted to be moved through a conduit and including an elongate, generally cylindrical roll of line having an external diameter less than the internal diameter of the conduit, and from the trailing end of which line is unwound as the line package moves through the conduit. This improved line package further includes a generally circular sealing member of flexible, compressible material secured to the roll of line and having an external diameter substantially corresponding to the internal diameter of the conduit through which the line is to be introduced to prevent any substantial passage of fluid between the line package and the internal wall of the conduit. As with the method and apparatus of my earlier U.S. Patent No. 3,120,947, this arrangement permits the practical and economical creation of a pressure differential within the conduit to move the line package therethrough, but without any rubbing frictional contact of a portion of the line package with the line being unwound as was the case with the cylindrical plug of this earlier patent of mine.

It is therefore an object of the present invention to provide apparatus for introducing a line through a conduit wherein an improved line package is utilized containing a roll of line from which line may be unwound as the line package moves through the conduit and wherein the requirement that the roll of line substantially fill the cross-sectional area of the conduit for practical and economical creation of a pressure differential within the conduit and frictional rubbing contact with the line being unwound are obviated.

A more specific object of the present invention is to provide apparatus of the character described wherein the improved line package includes a cylindrical roll of line which may have an external diameter materially less than the internal diameter of the conduit through which the line is to be introduced and wherein the line package further includes a sealing member of compressible material secured to the roll of line for movement therewith and having an external diameter substantially corresponding to the internal diameter of the conduit through which the line is to be introduced for preventing any appreciable loss of differential fluid pressure around the line package.

Some of the objects of the invention having been stated, other objects will appear as the description proceeds, when taken in connection with the accompanying drawings, in which:

FIGURE 7 is an exploded isometric view of a third form of line package embodying the features of the present invention;

FIGURE 8 is an isometric view of the assembled line package shown in FIGURE 7;

FIGURE 9 is a vertical sectional view similar to FIG-

Figure 3:
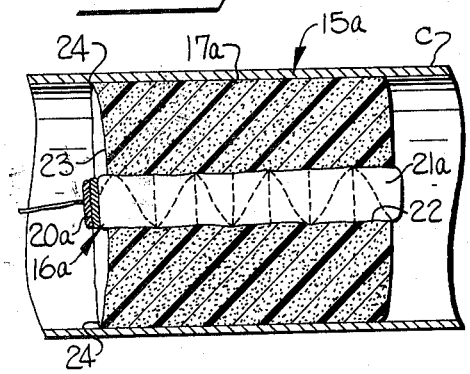
FIGURE 3 is a vertical sectional view of a portion of a conduit illustrating the line package shown in FIGURE 1 being passed therethrough.
Figure 5:
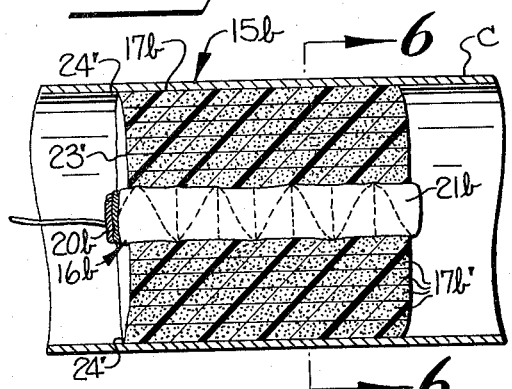
FIGURE 5 is a view similar to FIGURE 3, showing the line package of FIGURE 4 being passed through a conduit.

URES 3 and 5 illustrating the line package illustrated in FIGURES 7 and 8 being passed through a conduit;

FIGURE 10 is an isometric view of a fourth form of line package embodying the features of the present invention in unassembled form;

FIGURE 11 is an isometric view of the assembled line package shown in FIGURE 10;

FIGURE 12 is a view similar to FIGURES 3, 5 and 9 illustrating the line package shown in FIGURE 11 being passed through a conduit; and FIGURE 13 is a fragmentary schematic view showing a portion of a conduit extending through a building through which a line package is being passed to lay a line therein in accordance with the present invention.

Referring more specifically to the drawings, FIGURE 13 schematically illustrates the apparatus of the present invention for introducing a guide line through a length of conduit C which includes angular bends or offsets at various locations along its length, the conduit C being suitable for receiving electrical conductors or similar relatively rigid elongated articles therein.

The apparatus of the present invention includes means for creating a pressure differential within the conduit C and, as illustrated in the drawings, this means may comprise a mechanism, generally referred to at 10, for directing a fluid under pressure into one end of the conduit C. This mechanism 10 preferably includes a tapered sealing adapter 11 adapted to be placed against one open end of the conduit C to provide a closure therefor preventing the escape of fluid pressure from this end of the conduit C and is provided with a centrally disposed bore (not shown) through which fluid under pressure may be directed into the conduit C. This centrally disposed bore communicates with a suitable source of fluid under pressure outside of the conduit C, such as a portable container 12 of compressed gas, by means of a flexible tubing 13. A manually operable valve 14 is disposed in the dispensing outlet of the portable container 12 to control the delivery of fluid under pressure into the conduit through the flexible tubing 13 and the sealing adapter 11.

The apparatus of the present invention further includes a line package generally indicated at 15, four forms of which are illustrated in the drawings, and which includes a flexible, generally cylindrical supply of line 16 from the trailing end of which line may be unwound as the line package 15 moves through the conduit C. Supply of line 16 will generally be of an external diameter substantially less than the internal diameter of the conduit through which a line is to be introduced and, according to the present invention, a supply of line of a single size may be used in any size conduit. Line package 15 further includes a sealing member 17 secured to the supply of line 16 for movement therewith through the conduit and which has an external diameter exceeding the diameter of the supply of line and corresponding substantially to the internal diameter of the conduit C to be sealingly engageable with the internal wall of the conduit to substantially prevent the passage of fluid between the line package 15 and the internal wall of the conduit to thereby aid the mechanism 10 in the creation of a sufficient pressure differential within the conduit C to effectively move the line package 15 therethrough.

In passing the line package 15 through the conduit, a length of line is withdrawn from the supply of line 16 and the line package 15 is then placed within the open end of the conduit C. The sealing adapter 11 is then placed in closing relation to this end of the conduit and pinches one end of the line between the adapter and the internal wall of the conduit to effectively hold one end of the line as the line package 15 is moved through the conduit to assure unwinding of the line from the supply of line 16. Manually operable valve 14 is then opened and fluid under pressure is delivered into the conduit C behind the line package 15 to move the same through the conduit.

Figure 1:
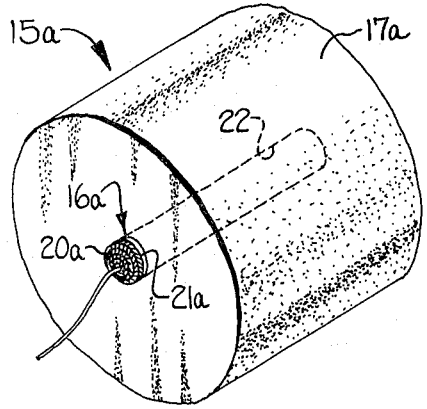
FIGURE 1 is an isometric view of a line package embodying the features of the present invention.
Figure 2:
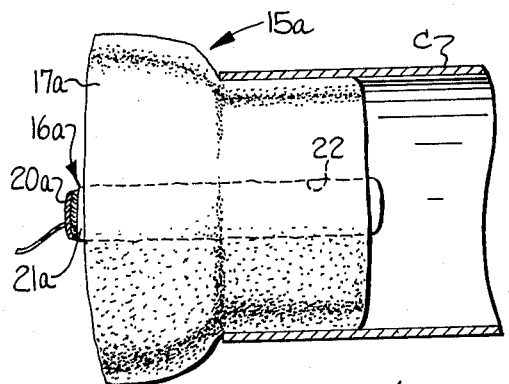
FIGURE 2 is an elevational view with a portion of a conduit shown in vertical section illustrating the line package shown in FIGURE 1 being positioned within a conduit.

Referring now to FIGURES 1 through 3 of the drawings, there is shown therein one form of the line package of the present invention which is generally indicated at 15a and which includes a supply of line 16a which comprises an elongate, generally cylindrical roll of line 20a preferably wound in such a manner that line may be unwound from the inside thereof at one end which corresponds to the trailing end thereof as the line package 15a is moved through the conduit C and which is flexible along its longitudinal extent. Preferably, supply of line 16a also includes a flexible elongate casing 21a snugly surrounding the cylindrical roll of line 20a except for the trailing end portion thereof which extends slightly through an open end in the casing 21a. Casing 21a is formed of suitable pliable material, such as paper or plastic, and, preferably, the casing 21a is formed by dipping all but the trailing end portion of the cylindrical roll of line 20a into a suitable supply of liquid plastic and then curing the plastic which adheres the outer windings of the roll of line 20a together for maintaining the cylindrical shape thereof. It should be understood, however, that the roll of line 20a may be directly used without the casing 21a thereon.

Line package 15a also includes a generally cylindrical sealing member 17a which comprises an elongated cylindrical plug of a length corresponding to a major portion of the length of the supply of line 16a and having an axially extending bore 22 therethrough which snugly, but releasably receives the supply of line 16a therein. Sealing member 17a is flexible and resilient throughout its length and possesses a high degree of compressibility, being preferably formed of elastomeric foam material, such as polyurethane foam.

Preferably, the sealing member 17a has a diameter at least as great as the internal diameter of the conduit C through which a line is to be introduced, and more preferably, the diameter of the sealing member 17a slightly exceeds the internal diameter of the conduit. The high degree of compressibility of sealing member 17a renders a line package 15a of a given external diameter usable with a wide range of internal diameters of conduits and the nature of the material forming sealing member 17a is such that no unusual frictional resistance problems are created thereby. By way of example, it has been determined that a line package 15a having a sealing member 17a with an external diameter of one and one-quarter (1¼) inches may be efficiently employed to introduce a guide line through conduits having internal diameters ranging from one-half (½) inch to one (1) inch; a line package 15a having a sealing member 17a with an external diameter of two and one-quarter (2¼) inches may be employed with conduits having internal diameters ranging from one and one-quarter (1¼) inches to two (2) inches; and a line package 15a having a sealing member 17a with an external diameter of four and one-quarter (4¼) inches may be employed with conduits having internal diameters ranging from two and one-half (2½) inches to four (4) inches. The effectiveness of the fluid-tight seal between the sealing member 17a and the internal wall of the conduit in the sizes and ranges given as examples is unimpaired and the line package 15a functions in an efficient manner to introduce a guide line through the length of the conduit.

Therefore, in utilizing the apparatus of the present invention to introduce a guide line through a conduit, the sealing member 17a is slightly compressed as the yarn package 15a is inserted into the open end of the conduit, as illustrated in FIGURE 2, and the outer peripheral surface thereof defines an elongated cylindriform sealing area in substantial sealing engagement with the internal wall of the conduit to substantially prevent the passage of fluid between the line package 15a and the internal wall of the conduit and thereby aids the mechanism 10 in the practical and economical creation of a pressure differential within the conduit to move the line package therethrough. This compression of the elastomeric synthetic foam material of the sealing member 17a results in producing a concave depression 23 in the trailing end thereof which is bounded by a peripheral, annular, rearwardly flaring tail 24. This concave depression 23 and rearwardly flaring tail 24 are shown in exaggerated form in FIGURE 3 to provide a clear illustration of these features.

The high flexibility and compressibility of the sealing member 17a and the flexibility of the supply of line 16a along their longitudinal extent enables the line package 15a to successfully negotiate sharp angular bends, which may be formed in the conduit C, the line package flexing to conform with such angular bends in the conduit as it passes therealong. In this way, the line package 15a is thrust through the length of the conduit C by the force of the fluid pressure differential created within the conduit C without needlessly wasting this fluid pressure and without the line package 15a becoming lodged within the conduit due to irregularities therein.

Figure 4:
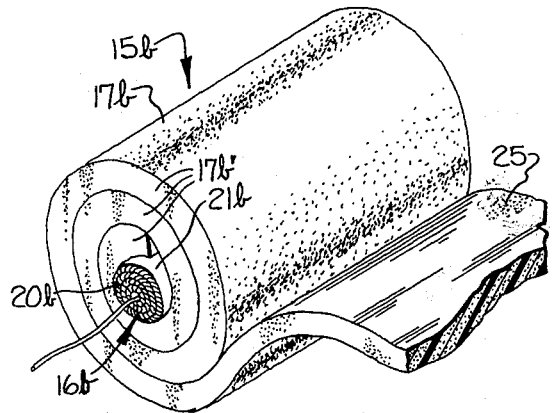
FIGURE 4 is an isometric view of a second form of line package of the present invention as it is being assembled.
Figure 6:
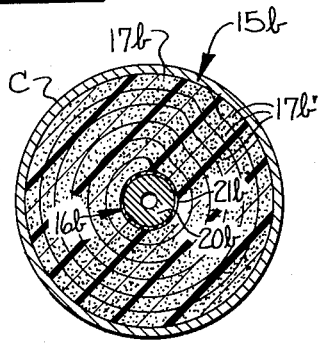
FIGURE 6 is a vertical sectional view taken substantially along line 6—6 in FIGURE 5.

Referring now to FIGURES 4 through 6, another form 15b of the line package of the present invention is illustrated and includes a flexible supply of line 16b which comprises an elongate, generally cylindrical roll of line 20b and, preferably, a flexible casing 21b snugly surrounding all but the trailing end portion of the roll of line 20b. Supply of line 16b is substantially the same as supply of line 16a described above.

Line package 15b also includes a flexible compressible sealing member 17b preferably formed of elastomeric synthetic foam material, such as polyurethane, which initially is in the form of an elongated flat strip of the material. This strip of material is coiled or wrapped around the supply of line 16b in a plurality of plies 17b' so as to form an elongated cylindrical plug snugly surrounding the supply of line 16b preferably for a major portion of the length thereof. The flat strip of material preferably includes an adhesive coating 25 on one side thereof to bind the adjacent wraps or plies 17b' together and to secure the sealing member 17b to the casing 21b surrounding the roll of line 20b.

After the line package 15b is formed in the aforementioned manner, the same is preferably of substantially the same size as line package 15a described above and has features corresponding thereto. In this respect, the sealing member 17b preferably has an external diameter at least as great as the internal diameter of the conduit C through which a line is to be introduced and, more preferably, has an external diameter slightly exceeding the internal diameter of the conduit. When inserted within the conduit, the outer peripheral surface thereof forms a cylindriform sealing area with the internal wall of the conduit to prevent the passage of fluid between the line package 15b and the internal wall of the conduit thereby aiding the mechanism 10 in the creation of a practical and economical pressure differential within the conduit to move the line package 15b through the conduit. Preferably, a concave depression 23' is formed in the trailing end portion of the sealing member 17b which is bounded by a rearwardly flaring tail 24' when the line package 15b is inserted within the conduit C.

Referring now to FIGURES 7 through 9, a third form 15c of the line package of the present invention is shown and includes a flexible supply of line 16c. Supply of line 16c is substantially of the same construction as the supplies of line 16a and 16b described above and comprises and elongate generally cylindrical roll of line 20c and, preferably, a casing 21c snugly surrounds the roll of line 20c except for the trailing end portion thereof. The roll of line 20c and casing 21c are flexible along the longitudinal extent thereof to permit the same to successfully negotiate sharp angular bends which may be formed in the conduit C.

Line package 15c also includes a generally circular flexible sealing member 17c of compressible synthetic foam material, such as polyurethane, secured to and serving to support the leading end portion of the supply of line 16c. Sealing member 17c is of a greater external diameter than the external diameter of the supply of line 16c, which is of substantially less external diameter than the internal diameter of the conduit C through which the line is to be introduced, and the external diameter of sealing member 17c generally corresponds to the internal diameter of the conduit C to be sealingly engageable with the internal wall thereof for reasons set forth above. In this respect, the external diameter of supply of line 16c will usually be about one-half (½) of an inch and the external diameter of sealing member 17c will usually be about one (1) inch or in a general two (2) to one (1) relationship to the external diameter of the supply of line 16c. More preferably, sealing member 17c has an external diameter sufficiently greater than the internal diameter of a conduit C through which a line is to be introduced so that when line package 15c is inserted into a vertical conduit, the frictional resistance between sealing member 17c and the internal wall of the conduit will be such that the line package will not fall further into or out of the conduit of its own weight. Accordingly, line package 15c having a sealing member of one and one-quarter (1¼) inches is primarily intended for use with conduits having internal diameters within the range of one-half (½) to one (1) inch. While line package 15c may be used with larger conduits, some decreased efficiency may be encountered since if the external diameter of sealing member 17c is substantially greater than twice the external diameter of the supply of line 16c, the trailing end of the supply of line, which is not supported by the sealing member 17c, will be at a sufficiently lower level than the leading end thereof so as to interfere with the sealing engagement of sealing member 17c with the internal wall of the conduit C and thereby permit fluid to leak therepast. This interferes with the creation of a fluid pressure differential in the conduit and, hence, interferes with the movement of line package 15c through the conduit. Of course, the external diameter of the supply of line 16c could be increased and then the external diameter of sealing member 17c could be increased accordingly for use in larger size conduits or some support for the trailing end of the supply of line, as for example, in line packages 15a and 15b, could be provided to accommodate line package 15c for use in such larger size conduits.

Sealing member 17c preferably comprises an initially flat circular disk of the compressible material having an adhesive 25' on one side thereof for securing the disk of compressible material to the leading end of the supply of line 16c. The disk of compressible material is then folded rearwardly into surrounding relation to the leading end portion of the supply of line 16c and is secured in this surrounding relation by the adhesive 25'.

With line package 15c, a very small frictional resistance is generated during passage of the line package through the conduit and, as a result, the pressure differential created within the conduit may be very low. Also, the cost of such a line package is very low and the same is very simple to manufacture and use.

Referring now to FIGURES 10 through 12, a fourth form 15d of the line package of the present invention is illustrated and is very similar to line package 15c described above. Line package 15d includes a supply of line 16d substantially the same as the supply of line 16c and including a generally cylindrical roll of line 20d and preferably a flexible casing 21d snugly surrounds the roll of line 20d except for the trailing end portion thereof.

A sealing member 17d is also included in the line package 15d and preferably is secured to and surrounds and supports the leading end portion of the supply of line 16d. The sealing member 17d is preferably formed of pliable compressible synthetic foam material, such as polyurethane, and has an adhesive 25" on one side thereof for securing the compressible material to the supply of line 16d. Also, sealing member 17d is preferably initially in the form of a relatively narrow, flat strip of a length corresponding substantially to the circumference of the supply of line 16d. This flat strip of material is wound around the leading end portion of the supply of line 16d and is secured in this surrounding relation by the adhesive 25", as shown in FIGURE 11.

Line package 15d embodies the features of line package 15c and is primarily intended for similar use in conduits of similar sizes. In this respect, the comments advanced in connection to the relative sizes of the supply of line and sealing member of line package 15c and the comments in connection with the preferred size of sealing member 17c and conduit C apply equally as well to line package 15d.

When positioned within a conduit C, the outer peripheral surface of the sealing member 17d forms a cylindriform sealing area with the internal wall of the conduit and substantially prevents the passage of fluid between the line package 15d and the internal wall of the conduit. This aids mechanism 10 in the creation of a fluid pressure differential within the conduit and, hence, aids in the movement of the line package 15d through the conduit.

From the foregoing specification, it is believed apparent that the present invention provides an improved apparatus for introducing guide lines through conduits wherein an improved line package is included which may be readily and easily moved through a conduit and which is sealingly engageable with the internal wall thereof to aid in the practical and economical creation of a pressure differential within the conduit for moving the line package through the conduit. Also, the present invention provides an improved line package which includes a flexible supply of line from which line is unwound as the line package is moved through the conduit and wherein there is no increasing frictional resistance to the passage of the line package through the conduit and, in fact, frictional resistance is decreased due to the decreasing weight of the line package.

In the drawings and specification there have been set forth preferred embodiments of the invention and, although specific terms are employed, they are used in a generic and descriptive sense only and not for purposes of limitation, the scope of the invention being defined in the claims.

I claim:
1. In an apparatus for introducing a line through a conduit including means for creating a pressure differential within the conduit; the combination of a line package adapted to be positioned in a conduit for movement therethrough by the pressure differential created by said pressure differential creating means to lay a line through the conduit and, when so positioned in the conduit, having a cross-sectional area substantially corresponding to the internal cross-sectional area of the conduit, said line package comprising
    (a) an elongate generally cylindrical roll of line having a cross-sectional area less than the internal cross-sectional area of the conduit and being adapted to be moved longitudinally through the conduit, the line being adapted to be unwound from the roll of line as the same moves through the conduit, and
    (b) a generally circular, flexible sealing member of compressible material secured to said roll of line and extending outwardly beyond the periphery of said roll of line and being adapted to sealingly engage the internal wall of the conduit for substantially preventing the passage of fluid between the line package and the internal wall of the conduit to aid in the creation of the pressure differential and the movement of said line package through the conduit.

2. Apparatus according to claim 1 wherein said sealing member surrounds at least a portion of said roll of line.

3. In an apparatus for introducing a line through a conduit including means for creating a pressure differential within the conduit; the combination of an elongate line package adapted to be positioned within a conduit and to be moved longitudinally therethrough by the pressure differential created by said pressure differential creating means to lay a line through the conduit, said line package comprising
    (a) an elongate cylindrical roll of line of an external diameter less than the internal diameter of the conduit and being flexible along its longitudinal extent so that the same may flex to conform to irregularities in the conduit as the same moves therethrough, the line being adapted to be unwound from the roll of line as the same moves through the conduit, and
    (b) a generally circular, flexible sealing member of compressible material secured to said roll of line and supporting at least the leading end portion thereof away from the walls of the conduit when said line package is positioned therein, said sealing member having an external diameter substantially corresponding to the internal diameter of the conduit to be sealingly engageable therewith for substantially preventing the passage of fluid between the line package and the internal wall of the conduit to aid in the creation of the pressure differential in the conduit and the movement of said line package through the conduit.

4. Apparatus according to claim 3 including
    (c) an elongate flexible casing snugly surrounding said roll of line and having an open trailing end through which the line may be unwound, and wherein said sealing member is secured to said casing.

5. In an apparatus for introducing a line through a conduit including means for creating a pressure differential within the conduit; the combination of a line package adapted to be positioned within a conduit for movement therethrough by the pressure differential created by said pressure differential creating means to lay a line through the conduit, and, when positioned within the conduit, having a cross-sectional area substantially corresponding to the internal cross-sectional area of the conduit, said line package comprising
    (a) an elongate cylindrical roll of line of an external diameter less than the internal diameter of the conduit and being flexible along its longitudinal extent so that the same may flex to conform to irregularities in the conduit as the same moves therethrough, the line being adapted to be unwound from the trailing end of said roll of line as the same moves through the conduit, and
    (b) a generally circular, flexible sealing member of compressible material secured to said roll of line and being in surrounding relation to at least the leading end portion thereof, the outer periphery of said sealing member being adapted to sealingly engage the internal wall of the conduit to substantially prevent the passage of fluid between the line package and the internal wall of the conduit to aid in the creation of the pressure differential and the movement of said line package through the conduit.

6. Apparatus according to claim 5 wherein said sealing member comprises an elongate cylindrical member of substantially uniform cross-section and having a longitudinally extending axial bore snugly receiving said roll of line therein.

7. Apparatus according to claim 5 wherein said sealing member comprises a generally flat strip of the compressible material wrapped around said roll of line.

8. Apparatus according to claim 5 wherein said sealing member comprises an initially flat disk of the compressible material secured to the leading end of said roll of line and being folded back into surrounding relation to the leading end portion of said roll of line.

9. In an apparatus for introducing a line through a conduit including means for creating a pressure differential within the conduit; the combination of a line package adapted to be positioned within the conduit for movement therethrough by the pressure differential created by said pressure differential creating means to lay a line through the conduit, said line package comprising (a) an elongate cylindrical roll of line of an external diameter less than the internal diameter of the conduit and being flexible along its longitudinal extent so that the same may flex to conform to irregularities in the conduit as the same moves longitudinally therethrough, said roll of line being wound so that the line is adapted to be unwound from the inside of said roll as the same moves through the conduit, (b) an elongate flexible casing snugly surrounding said roll of line and having an open end corresponding to the trailing end of said roll of line to permit the line to be unwound from said roll of line, and (c) an elongate generally cylindrical flexible sealing member of compressible material and being substantially uniform in transverse cross-section, said sealing member being of a length corresponding to a major portion of the length of said roll of line and having a longitudinally extending axial bore snugly receiving said roll of line and said casing therein, said sealing member having an external diameter at least as great as the internal diameter of the conduit for substantial sealing engagement of the peripheral surface thereof with the internal wall of the conduit to substantially prevent the passage of fluid between the line package and the internal wall of the conduit to aid in the creation of the pressure differential and the movement of said line package through the conduit.

10. In an apparatus for introducing a line through a conduit including means for creating a pressure differential within the conduit; the combination of a line package adapted to be positioned within the conduit for movement therethrough by the pressure differential created by said pressure differential creating means to lay a line through the conduit, said line package comprising (a) an elongate cylindrical roll of line of an external diameter less than the internal diameter of the conduit and being flexible along its longitudinal extent so that the same may flex to conform to irregularities in the conduit as the same moves longitudinally therethrough, the roll of line being wound so that the line is adapted to be unwound from the inside of said roll as the same moves through the conduit, (b) an elongate flexible casing snugly surrounding said roll of line and having an open end corresponding to the trailing end of said roll of line to permit the line to be unwound from said roll of line, and (c) an elongate generally cylindrical flexible sealing member of compressible material formed of an initially flat strip of material spirally wound around said roll of line and said casing in a plurality of spiral wraps snugly surrounding said roll of line and casing for a major portion of the length thereof, said sealing member having an external diameter at least as great as the internal diameter of the conduit for substantial sealing engagement of the peripheral surface thereof with the internal wall of the conduit to substantially prevent the passage of fluid between the line package and the internal wall of the conduit to aid in the creation of the pressure differential and the movement of said line package through the conduit.

11. In an apparatus for introducing a line through a conduit including means for creating a pressure differential within the conduit; the combination of a line package adapted to be positioned within the conduit for movement therethrough by the pressure differential created by said pressure differential creating means to lay a line through the conduit, said line package comprising (a) an elongate cylindrical roll of line of an external diameter less than the internal diameter of the conduit and being flexible along its longitudinal extent so that the same may flex to conform to irregularities in the conduit as the same moves longitudinally therethrough, the line being adapted to be unwound from the roll as the roll moves through the conduit, (b) an elongate flexible casing snugly surrounding said roll of line and having an open end corresponding to the trailing end of said roll of line to permit the line to be unwound from said roll of line, and (c) a generally circular, flexible sealing member of compressible material comprising an initially flat disk adhesively secured to the leading end of said roll of line and said casing and folded back into surrounding relation to the leading end portion of said roll of line and said casing and being adhesively secured thereto in this surrounding relation, said sealing member having an external diameter substantially corresponding to the internal diameter of the conduit for sealing engagement therewith to substantially prevent the passage of fluid between the line package and the internal wall of the conduit to aid in the creation of the pressure differential and the movement of said line package through the conduit.

12. In an apparatus for introducing a line through a conduit including means for creating a pressure differential within the conduit; the combination of a line package adapted to be positioned within the conduit for movement therethrough by the pressure differential created by said pressure differential creating means to lay a line through the conduit, said line package comprising (a) an elongate cylindrical roll of line of an external diameter less than the internal diameter of the conduit and being flexible along its longitudinal extent so that the same may flex to conform to irregularities in the conduit as the same moves longitudinally therethrough, the line being adapted to be unwound from the roll as the roll moves through the conduit, (b) an elongate flexible casing snugly surrounding said roll of line and having an open end corresponding to the trailing end of said roll of line to permit the line to be unwound from said roll of line, and (c) a generally cylindrical, flexible sealing member of compressible material comprising an initially flat, narrow strip of a length corresponding generally to the circumference of said casing and being wound around the leading end portion of said roll of line and said casing and being adhesively secured thereto, said sealing member having an external diameter corresponding generally to the internal diameter of the conduit to be sealingly engageable therewith for substantially preventing the passage of fluid between the line package and the internal wall of the conduit to aid in the creation of the pressure differential and the movement of said line package through the conduit.

13. A line package adapted to be positioned within a conduit for movement therethrough to lay a line through the conduit, said line package comprising (a) an elongate generally cylindrical roll of line having a cross-sectional area less than the internal cross-sectional area of the conduit and being adapted to be moved longitudinally through the conduit, the line being adapted to be unwound from the trailing end of said roll of line as the same moves through the conduit, and (b) a generally circular, flexible sealing member of compressible material secured to at least the leading end portion of said roll of line opposite the end from which the line is adapted to be unwound and being of an outer diameter exceeding the outer diameter of said roll of line and generally corresponding to the internal diameter of the conduit through which the line is to be introduced, said sealing member being adapted to support at least the leading end portion of said roll of line away from the walls of the conduit during movement of the line package therethrough.

14. A line package adapted to be positioned within a conduit for movement therethrough to lay a line through the conduit, said line package comprising
   (a) an elongate generally cylindrical roll of line having a cross-sectional area less than the internal cross-sectional area of the conduit and being adapted to move longitudinally through the conduit, the line being adapted to be unwound from the trailing end of said roll of line as the same moves through the conduit, and
   (b) an elongate, generally cylindrical, flexible sealing member of compressible material and being substantially uniform in transverse cross-section, said sealing member being of a length corresponding to a major portion of the length of said roll of line and having a longitudinally extending axial bore snugly receiving said roll of line therein, said sealing member having an external diameter at least as great as the internal diameter of the conduit through which the line is to be introduced to be sealingly engageable with the internal wall of the conduit during movement of the line package therethrough.

15. A line package adapted to be positioned within a conduit for movement therethrough to lay a line through the conduit, said line package comprising
   (a) an elongate generally cylindrical roll of line having a cross-sectional area less than the internal cross-sectional area of the conduit and being adapted to be moved longitudinally through the conduit, the line being adapted to be unwound from the trailing end of said roll of line as the same moves through the conduit, and
   (b) an elongate, generally cylindrical, flexible sealing member of compressible material formed of an initially flat strip of the compressible material wound around said roll of line in a plurality of spiral wraps snugly surrounding said roll of line for a major portion of the length thereof, said sealing member having an external diameter at least as great as the internal diameter of the conduit through which the line is to be introduced to be sealingly engageable with the internal wall of the conduit during movement of the line package therethrough.

16. A line package adapted to be positioned within a conduit for movement therethrough to lay a line through the conduit, said line package comprising
   (a) an elongate generally cylindrical roll of line having a cross-sectional area less than the internal cross-sectional area of the conduit and being adapted to move longitudinally through the conduit, the line being adapted to be unwound from the trailing end of said roll of line as the same moves through the conduit, and
   (b) a generally circular, flexible sealing member of compressible material comprising an initially flat disk adhesively secured to the leading end of the roll of line and being folded back into surrounding relation to the leading end portion of said roll of line and being adhesively secured thereto in this surrounding relation, said sealing member having an external diameter substantially corresponding to the internal diameter of the conduit through which the line is to be introduced to be sealingly engageable therewith during movement of the line package through the conduit.

17. A line package adapted to be positioned within a conduit for movement therethrough to lay a line through the conduit, said line package comprising
   (a) an elongate generally cylindrical roll of line having a cross-sectional area less than the internal cross-sectional area of the conduit and being adapted to be moved longitudinally through the conduit, the line being adapted to be unwound from the trailing end of said roll of line as the same moves through the conduit, and
   (b) a generally cylindrical, flexible sealing member of compressible material comprising an initially flat, narrow strip of a length corresponding generally to the circumference of said roll of line and being wound around the leading end portion of said roll of line and being adhesively secured thereto, said sealing member having an external diameter corresponding generally to the internal diameter of the conduit through which the line is to be introduced to be sealingly engageable with the internal wall of the conduit during movement of the line package through the conduit.

References Cited by the Examiner

UNITED STATES PATENTS

| 252,956 | 1/1882 | Loane | 254—134.4 |
| 2,729,424 | 1/1956 | Eppensteiner | 254—134.3 |
| 3,119,600 | 1/1964 | Bitter | 254—134.4 |

WILLIAM FELDMAN, *Primary Examiner.*